United States Patent
Voelz et al.

(10) Patent No.: US 10,601,281 B2
(45) Date of Patent: Mar. 24, 2020

(54) MODULAR DIRECT DRIVE SYSTEM FOR AN INDUSTRIAL MACHINE

(71) Applicant: Harnischfeger Technologies, Inc., Wilmington, DE (US)

(72) Inventors: Nicholas R. Voelz, Jackson, WI (US); Joseph Colwell, Hubertus, WI (US); David Wendt, Hubertus, WI (US)

(73) Assignee: Joy Global Surface Mining Inc., Milwaukee, WI (US)

( * ) Notice: Subject to any disclaimer, the term of this patent is extended or adjusted under 35 U.S.C. 154(b) by 1115 days.

(21) Appl. No.: 13/835,363

(22) Filed: Mar. 15, 2013

(65) Prior Publication Data
US 2013/0249336 A1  Sep. 26, 2013

Related U.S. Application Data (60) Provisional application No. 61/615,569, filed on Mar. 26, 2012.

(51) Int. Cl.
*H02K 7/116* (2006.01)
*E02F 3/30* (2006.01)

(52) U.S. Cl.
CPC .............. *H02K 7/116* (2013.01); *E02F 3/305* (2013.01); *E02F 3/308* (2013.01)

(58) Field of Classification Search
CPC ........................... H02K 7/116; H02K 2213/12
USPC ...................................................... 310/77, 83
See application file for complete search history.

(56) References Cited

U.S. PATENT DOCUMENTS

| | | | |
|---|---|---|---|
| 1,481,234 A | 1/1924 | Smith | |
| 3,258,143 A * | 6/1966 | Steinmann | E02F 3/304 414/690 |
| 3,819,018 A | 6/1974 | Muller et al. | |
| 3,892,300 A * | 7/1975 | Hapeman | B60K 7/0007 180/65.51 |
| 4,014,224 A * | 3/1977 | Pitts | F16H 1/32 475/176 |

(Continued)

FOREIGN PATENT DOCUMENTS

| | | |
|---|---|---|
| CN | 101641481 | 2/2010 |
| CN | 101988566 | 3/2011 |

(Continued)

OTHER PUBLICATIONS

Patent Examination Report No. 1 and Search Information Statement from IP Australia for Australian Application No. 2013202065 dated Sep. 1, 2014 (5 pages).

(Continued)

*Primary Examiner* — Quyen P Leung
*Assistant Examiner* — Eric Johnson
(74) *Attorney, Agent, or Firm* — Michael Best & Friedrich LLP (57) ABSTRACT

A modular drive system for use with an industrial machine having a gear case includes a motor system. The motor system includes a motor housing and a motor shaft disposed in the motor housing. The motor system has a first, non-drive end and a second, drive end. The modular drive system also includes a brake system coupled to the second end of the motor system, and a drive gear coupled to the motor shaft, the drive gear disposed between the first end and the brake system.

18 Claims, 10 Drawing Sheets

(56) References Cited

U.S. PATENT DOCUMENTS

| | | | | |
|---|---|---|---|---|
| 4,146,104 | A * | 3/1979 | Leembruggen | B60G 3/00 180/305 |
| 4,216,848 | A * | 8/1980 | Shimodaira | B66D 5/04 188/184 |
| 4,339,225 | A * | 7/1982 | Donnally | E02F 3/42 414/690 |
| 4,702,524 | A * | 10/1987 | Mork | E02F 3/30 299/18 |
| 4,854,547 | A * | 8/1989 | Oliphant | B66D 1/08 254/271 |
| 5,533,712 | A * | 7/1996 | Fujikawa | B66D 1/58 254/362 |
| 5,738,339 | A * | 4/1998 | Kuryu | B66D 1/7415 182/234 |
| 6,139,464 | A * | 10/2000 | Roske | B60K 7/0007 180/65.6 |
| 7,669,681 | B2 | 3/2010 | Lee | |
| 8,432,079 | B2 * | 4/2013 | Lemmers, Jr. | H02K 7/116 310/100 |
| 2007/0209853 | A1 * | 9/2007 | Nakajima | B60K 7/0007 180/65.51 |
| 2007/0266601 | A1 * | 11/2007 | Claxton | E02F 3/30 37/396 |
| 2012/0280585 | A1 * | 11/2012 | Shaffer | H02K 7/116 310/83 |

FOREIGN PATENT DOCUMENTS

| | | |
|---|---|---|
| DE | 3028656 | 2/1982 |
| DE | 10200504 | 2/1982 |
| GB | 2033530 | 3/1983 |

OTHER PUBLICATIONS

Second Examination Report from the Australian Intellectual Property Office for Application No. 2013202065 dated Apr. 29, 2015 (6 pages).

Third Examination Report from the Australian Intellectual Property Office for Application No. 2013202065 dated Dec. 7, 2015 (5 pages).

First Office Action from the State Intellectual Property Office of China for Application No. 201310099947.8 dated May 29, 2016 (21 pages).

Office Action from the Chilean Intellectual Property Office for Application No. 0808-2013 dated Sep. 16, 2016 (10 pages, which includes an English abstract).

Second Office Action from the State Intellectual Property Office of China for Application No. 201310099947.8 dated Dec. 27, 2016 (12 pages).

Third Office Action from the State Intellectual Property Office of China for Application No. 201310099947.8 dated Apr. 10, 2017 (6 pages).

* cited by examiner

MODULAR DIRECT DRIVE SYSTEM FOR AN INDUSTRIAL MACHINE

CROSS REFERENCE TO RELATED APPLICATIONS

This application claims priority to U.S. Provisional Application No. 61/615,569, filed Mar. 26, 2012, the entire contents of which are incorporated herein by reference.

FIELD OF THE INVENTION

The present invention relates to a drive system for an industrial machine, such as an electric rope or power shovel.

BACKGROUND OF THE INVENTION

In the mining field, and in other fields in which large volumes of materials must be collected and removed from a work site, it is typical to employ industrial machines including a large dipper for shoveling the materials from the work site. Industrial machines, such as electric rope or power shovels, draglines, etc., are used to execute digging operations to remove material from, for example, a bank of a mine. Electric rope shovels typically include a shovel boom, a handle pivotally extending from the boom and supporting the dipper, and a sheave or pulley rotatably supported on the boom. The handle is driven by a crowd drive mechanism including, among other components, a crowd motor, belt, sheaves, gearing, etc. A hoist rope extends around the sheave or pulley and is connected to the shovel dipper to raise and lower the dipper, thereby producing an efficient digging motion to excavate the bank of material.

During operation, as a shovel operator crowds out the dipper handle (i.e., moves the dipper handle away from the industrial machine) to the bank, the operator oftentimes requests full speed from the crowd motor. Impacting the bank of material results in the dipper abruptly stopping. Specifically, the dipper and the handle come to a physical stop while the crowd motor continues to provide torque in an attempt to maintain the requested speed. In addition, all the inertia in the industrial machine drives the system forward. The forces generated by the system inertia and the abrupt stop of the dipper result in boom jacking. Boom jacking is a kick back of the entire boom due to excess crowd reaction forces. The boom jacking or kick back caused by the crowd reaction forces oftentimes results in the industrial machine tipping in a rearward direction (i.e., a tipping moment or center-of-gravity ["CG"] excursion away from the bank). Such tipping moments introduce cyclical stresses on the industrial machine and its components, which can cause weld cracking and other strains. The degree to which the industrial machine is tipped in either the forward or rearward directions impacts the structural fatigue that the industrial machine experiences. Limiting boom jacking and the maximum forward and/or rearward tipping moments of the industrial machine thus increases the operational life of the industrial machine.

SUMMARY

In accordance with one construction, a modular drive system for use with an industrial machine having a gear case includes a motor system. The motor system includes a motor housing and a motor shaft disposed in the motor housing. The motor system has a first, non-drive end and a second, drive end. The modular drive system also includes a brake system coupled to the second end of the motor system, and a drive gear coupled to the motor shaft, the drive gear disposed between the first end and the brake system.

In accordance with another construction, an industrial machine includes a mobile base, a boom coupled to the mobile base, a dipper arm coupled to the boom, and a transmission unit coupled to the dipper arm to move the dipper arm relative to the boom. The transmission unit includes a gear case. The industrial machine also includes a drive system coupled to the gear case, the drive system including a motor system with a first, non-drive end and a second, drive end. The drive system also includes a brake system coupled to the second end of the motor system, and a drive gear coupled to the motor system between the first end and the brake system.

Other aspects of the invention will become apparent by consideration of the detailed description and accompanying drawings.

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limited.

DETAILED DESCRIPTION

The modular drive systems described herein are of particular benefit for use with industrial mining machines. The industrial mining machines, such as an electric rope shovel or similar mining machine, are operable to execute a digging operation to remove a payload (i.e., material) from a bank. During operation of the machine, the handle of the machine is frequently crowding or retracting in order to dig in the bank of the material or to unload the machine. The outward crowding of the dipper handle can result in sudden stops of the dipper when the dipper impacts a heavy object (e.g., a boulder). The forces created by the abrupt stop of the dipper and the system inertia can result in boom jacking of the industrial machine. Boom jacking causes the machine to tip backwards, which impacts the life of the structural elements of the industrial machine. Limiting or eliminating boom jacking and, consequently, backwards tipping of the machine increases the operational life of these structural elements.

The modular drive systems described herein eliminate large amounts of inertia present, for example, in the existing typical crowd drives. The typical large crowd motor, belt and sheaves are replaced with a direct drive system. Specifically, the new modular drive system includes smaller, modular motors that directly drive the crowd transmissions and have lower inertia. The modular drive system is less maintenance intensive as compared to the existing system because it eliminates the belts and sheaves of the existing drive. The removal of these elements drastically reduces the system inertia allowing for a more responsive drive and potentially higher productivity of the machine. The modularity of the proposed design allows replacement of a malfunctioning/ broken drive with a functioning drive relatively quickly, which minimizes the downtime on the shovel. The broken drive can then be repaired in a re-build shop as opposed to in the field. Additionally, while the drive systems are described in the context of a crowd drive, the modular drive systems can be used on other areas of the mining machine, or other machines. Other advantages of the new modular drive system will be described in detail below.

Figure 1:
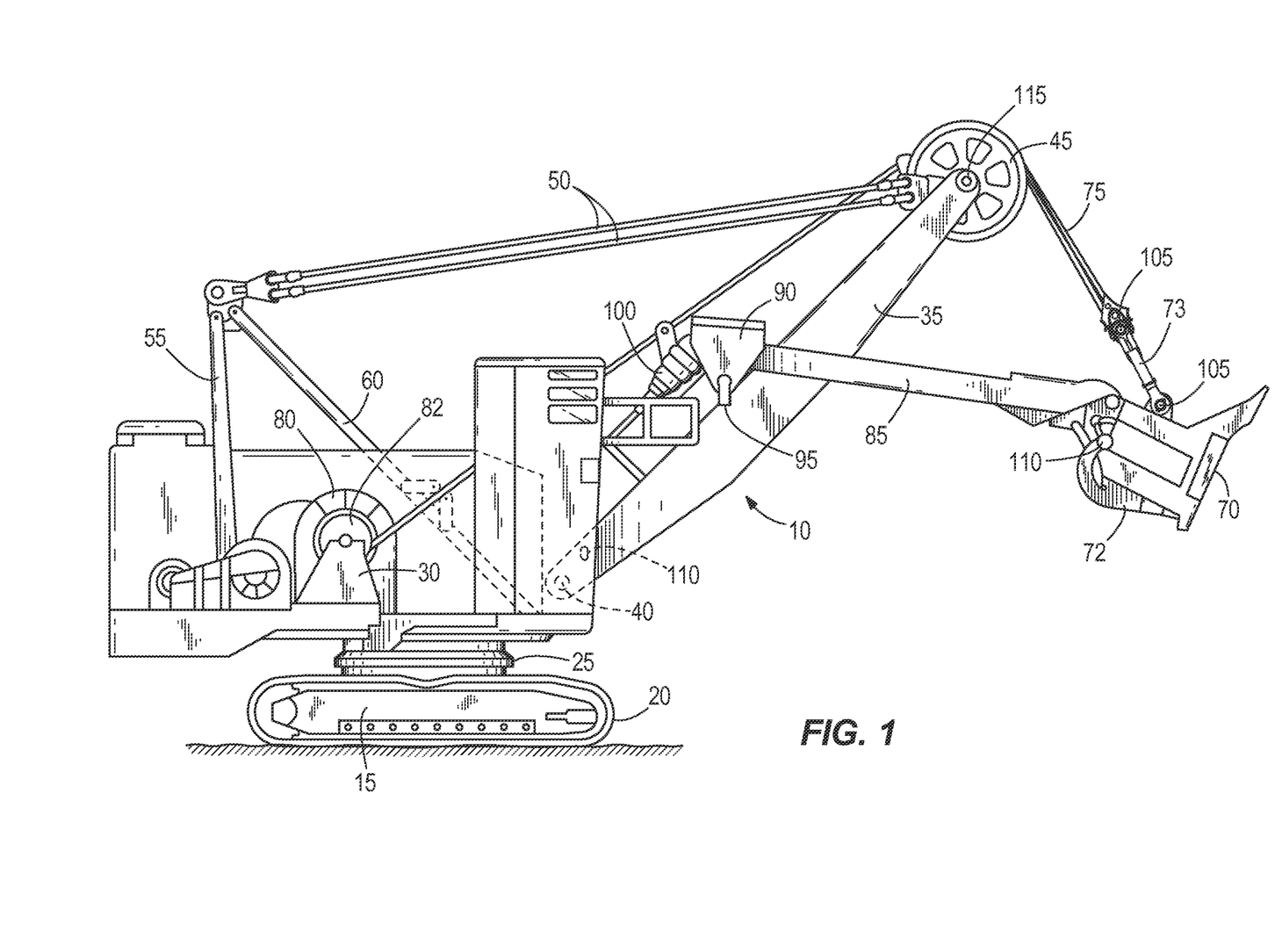
FIG. 1 illustrates an industrial machine.

Although the constructions described herein are applicable to a variety of industrial machines, constructions of the invention described herein are described specifically with respect to a power shovel, such as shovel 10 shown in FIG. 1.

With reference to FIG. 1, the shovel 10 includes a mobile base 15, drive tracks 20, a turntable 25, a revolving frame 30, a boom 35, a lower end 40 (also called a boom foot), tension cables 50, a gantry tension member 55, a gantry compression member 60, a dipper 70 having a door 72, a bail 73, one or more hoist ropes 75, a winch drum 80, dipper arm or handle 85, a saddle block 90, a pivot point 95 (i.e., a shipper shaft), a transmission unit 100 (also called a crowd drive), a bail pin 105, a dipper door pin 110, and a boom point pin 115.

The mobile base 15 is supported by the drive tracks 20. The mobile base 15 supports the turntable 25 and the revolving frame 30. The turntable 25 is capable of 360-degrees of rotation about the revolving deck 30 relative to the mobile base 15. The boom 35 is pivotally connected at the lower end 40 to the revolving frame 30. The boom 35 is held in an upwardly and outwardly extending relation to the deck by the tension cables 50, which are anchored to the gantry tension member 55 and the gantry compression member 60. The gantry compression member 60 is rigidly mounted on the revolving frame 30, and the sheave 45 is rotatably mounted on the upper end of the boom 35.

The dipper 70 is suspended from the boom 35 by the hoist ropes 75. The hoist rope 75 is wrapped over the sheave 45 and coupled to the dipper 70 at the bail 73. The hoist rope 75 is anchored to the winch drum 80 of the revolving frame 30. The winch drum 80 is driven by at least one electric motor 82 that incorporates a transmission unit (not shown). As the winch drum 80 rotates, the hoist rope 75 is paid out to lower the dipper 70 or pulled in to raise the dipper 70. The dipper handle 85 is also rigidly coupled to the dipper 70. The dipper handle 85 is slidably supported in a saddle block 90, and the saddle block 90 is pivotally mounted to the boom 35 at the pivot point 95. The dipper handle 85 includes a rack tooth formation thereon that engages a drive pinion mounted in the saddle block 90. The drive pinion is driven by an electric motor and transmission unit 100 to extend or retract the dipper arm 85 relative to the saddle block 90.

An electrical power source is mounted to the revolving frame 30 to provide power to the hoist electric motor 82 for driving the hoist drum 80, one or more crowd electric motors for driving the crowd transmission unit 100, and one or more swing electric motors for turning the turntable 25. Each of the crowd, hoist, and swing motors can be driven by its own motor controller or drive in response to control signals from a controller, as described below.

The shovel 10 also includes a controller (not shown) associated with the operation of shovel 10. The controller is electrically and/or communicatively connected to a variety of modules or components of the shovel 10. For example, the controller is connected to one or more sensors, a user interface, one or more hoist motors and hoist motor drives, one or more crowd motors and crowd motor drives, one or more swing motors and swing motor drives, etc. (these elements are not shown in the drawings). The controller includes combinations of hardware and software that are operable to, among other things, control the operation of the power shovel 10, control the position of the boom 35, the dipper arm 85, the dipper 70, etc., monitor the operation of the shovel 10, etc. The sensors can include, among other things, position sensors, velocity sensors, speed sensors, acceleration sensors, an inclinometer, one or more motor field modules, etc.

In some constructions, the controller includes a plurality of electrical and electronic components that provide power, operational control, and protection to the components and modules within the controller and/or shovel 10. For example, the controller includes, among other things, a processing unit (e.g., a microprocessor, a microcontroller, or another suitable programmable device), a memory, input units, and output units (not shown). The processor of the controller sends control signals to control the operations of the shovel 10. For example, the controller can monitor and/or control, among others, the digging, dumping, hoisting, crowding, and swinging operations of the shovel 10.

A goal of the drive systems described herein is to eliminate the inertia in the existing crowd drives that causes unwanted and unnecessary forces when the dipper impacts the bank, which can result in boom jacking of the shovel 10. A large amount of the inertia resides in the following elements of a crowd drive—the crowd motor, the belt, and the belt sheaves. Therefore, the invention proposes a new drive system for the shovel 10. Specifically, the existing large crowd motor, belt and sheaves are replaced with a direct drive system. The direct drive system includes redesigned, smaller, modular motors that directly drive the crowd system and have much lower inertia, which results in a more responsive drive. This decreases the possibility of boom jacking of the machine during operation and lowers resulting loading on crowd machine components. Consequently, this reduces the structural fatigue on the industrial machine (e.g., structural fatigue on a mobile base, a turntable, a machinery deck, a lower end, etc.) and increases the operational life of the industrial machine.

Figure 2:
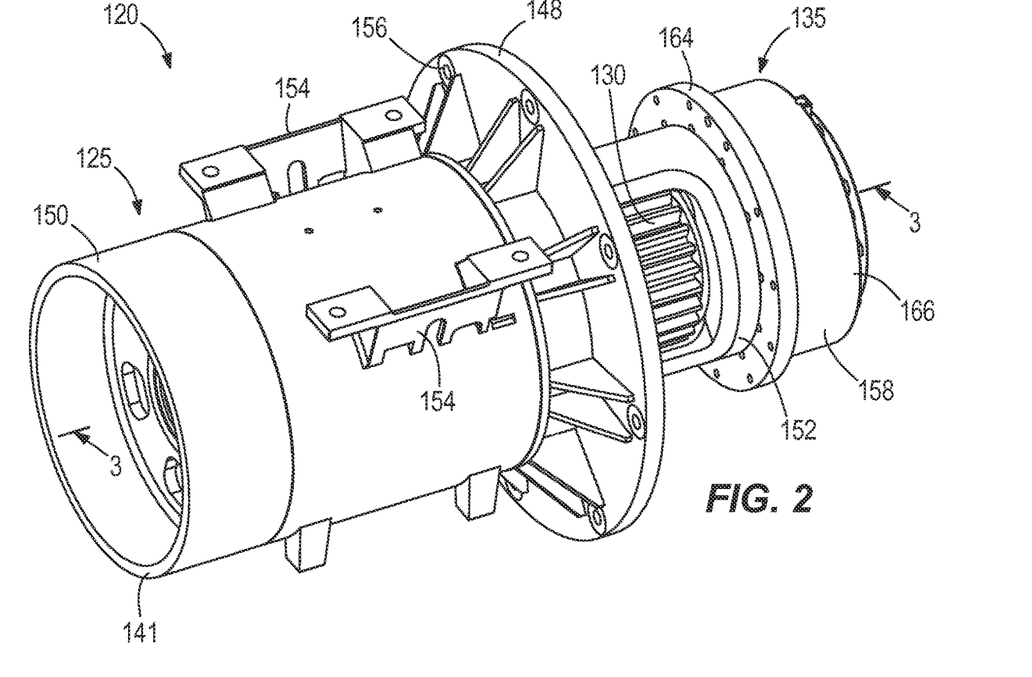
FIG. 2 illustrates a modular drive system for the industrial machine of FIG. 1 according to one construction of the invention.
Figure 3:
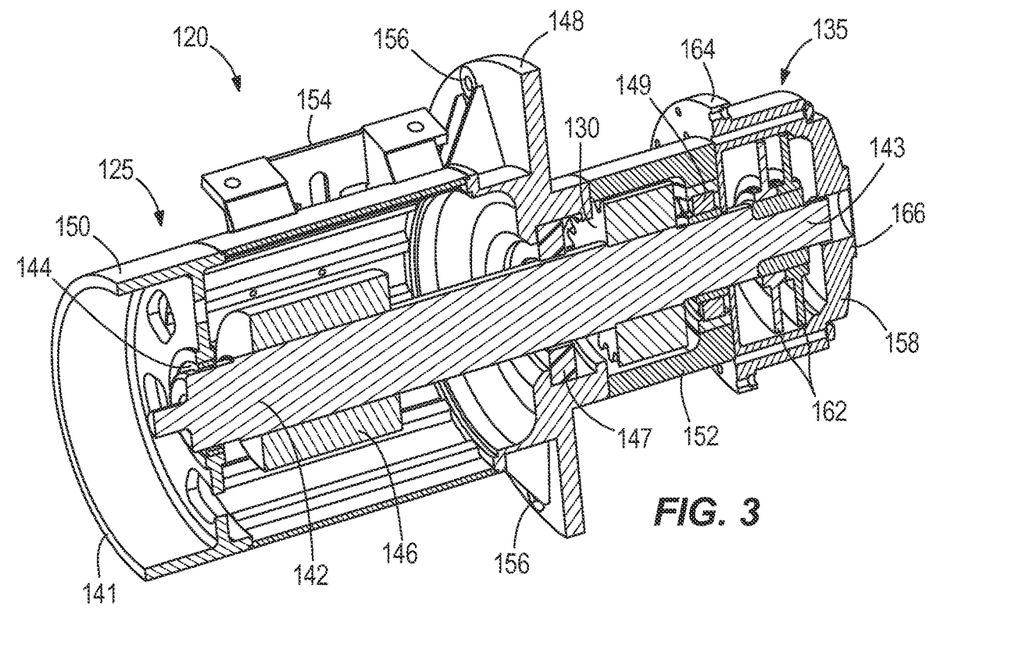
FIG. 3 illustrates a cross-sectional view of the modular drive system shown in FIG. 2 taken along section line 3-3.
Figure 4:
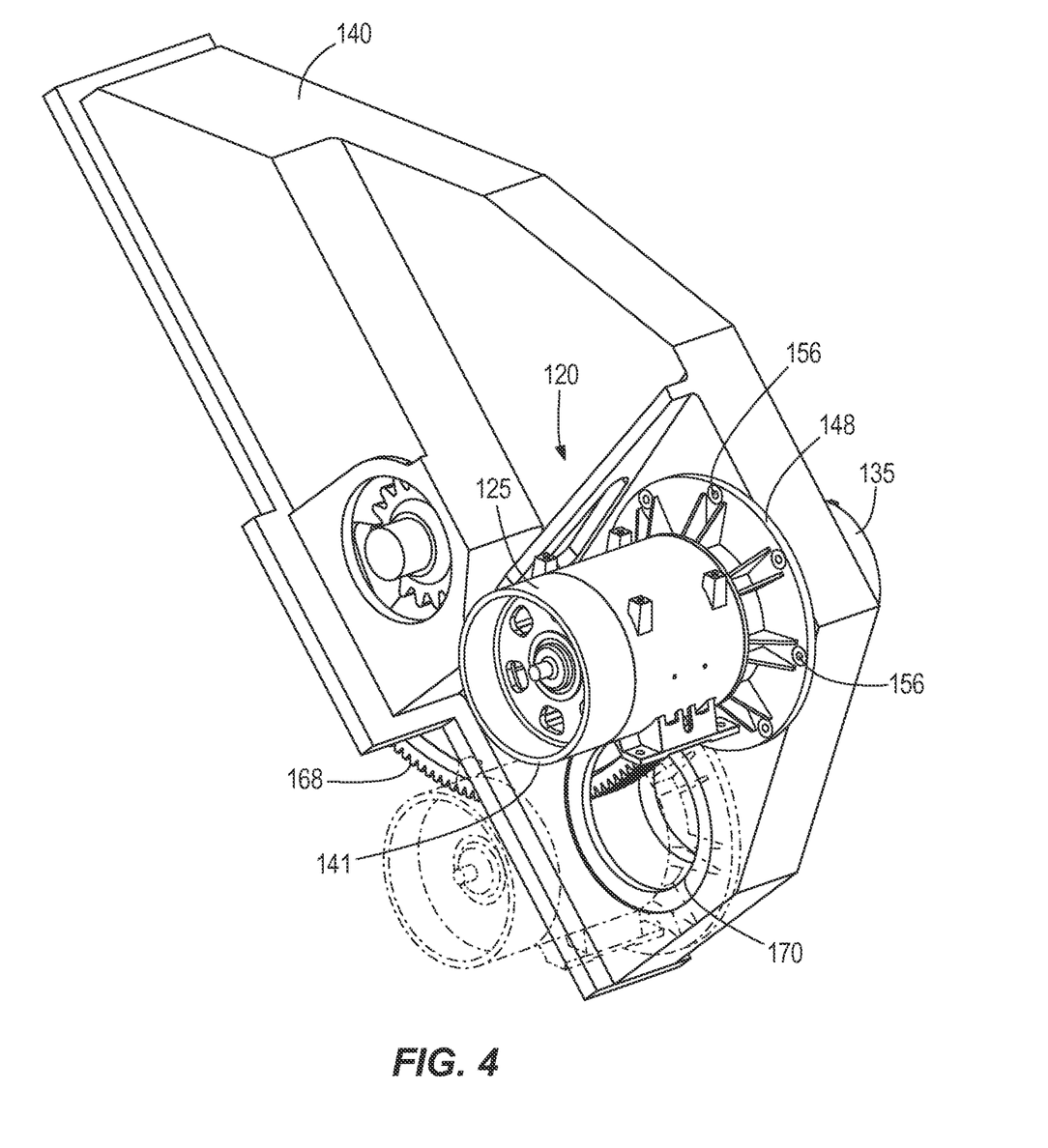
FIG. 4 illustrates the modular drive system of FIG. 2 coupled to a gear case of the industrial machine of FIG. 1.

FIGS. 2-4 illustrate a modular drive system 120 according to one construction of the invention. The drive system 120 includes a motor system 125, a drive gear 130 (e.g., a pinion), and a brake system 135. The drive system 120 is removably coupled to a gear case 140 (FIG. 4) of the shovel 10. The drive system includes one or more motors 120. In the illustrated construction, two motors 120 are mounted to the gear case 140 and are used as a crowd drive mechanism that moves the dipper handle 85. In some constructions, all of the elements of the drive system 120 are individually or collectively removed and/or replaced allowing for a faster repair and less downtime of the shovel 10.

The motor system 125 includes a motor housing 141, a motor shaft 142 (also called a drive shaft) extending through the housing 141 and into the brake system 135, a first bearing 144, a rotor 146, a deflection limiting bushing 147, a flange 148, and a second bearing 149. The motor system 125 may include other standard elements of an electric motor (e.g., a stator, etc.). The motor system 125 may include one or more permanent magnet motors, switched reluctance motors, AC induction motors, and other types of motors.

The motor housing 141 defines a first non-drive end 150 of the motor system 125 and a second drive end 152 of the motor system. The deflection bushing 147 limits peak deflections in the shaft 142 that would otherwise cause non-desired loading on the teeth of the drive gear 130. Further, the bushing 147 allows for easier replacement of the drive gear 130. In some constructions, the motor housing 141 can be constructed without the bushing 147. The first bearing 144 is positioned at the first non-drive end 150 of the motor housing 141, and the second bearing 149 is positioned at the second drive end 152 of the motor housing 141. Therefore, as opposed to traditional motor assemblies, the second bearing 149 is outboard of the drive gear 130. This configuration allows the second bearing 149 to better support the motor shaft 142. As will be explained in more detail below, the brake system 135 is positioned proximate to the second bearing 149 and a distal end 143 of the motor shaft 142 extends out of the motor housing 141 and into the brake system 135. This configuration allows for creating a more compact crowd motor that can be applied to an existing shovel boom geometry.

In the illustrated construction, the motor housing 141 includes projections 154 extending from the housing, which are used for lifting and/or mounting the motor housing 141. The flange 148 includes apertures 156 that used to couple the motor system 125, and thereby the drive system 120, to the gear case 140.

The brake system 135 includes a brake housing 158 and brake disks 162 disposed in the brake housing 158. The brake housing 158 defines a first end 164 and a second end 166. The first end 164 of the brake housing 158 is positioned adjacent to the second end 152 of the motor housing 141 such that the motor shaft 142 extends into the brake housing 158. The brake disks 162 engage the motor shaft 142 and stop operation of the motor when necessary. In one construction, the brake system 135 is combined with the motor system 125 and the gear 130, and all are installed as a module. As explained below, in the illustrated construction, the brake system 135 is installed as a separate element after the motor system 125 and the gear are coupled to the gear case 140. This allows free access to the brake housing 158 so that the brake system 135 can be removed and/or replaced when necessary. In some constructions the brake system 135 is integrally formed with the motor system 125.

The brake system 135 is positioned at a front (i.e., drive end) of the motor system 125. Traditionally, similar brake assembles are positioned at a back (i.e., non-drive) end of a motor system. The traditional configuration requires extra weight to be placed in other portions of the crowd gearing to support the motor and, therefore, creates a heavier crowd drive. Consequently, positioning the brake system 135 near the drive end of the motor system 125 and the second bearing 149 creates a smaller drive system 120 and allows for a modular drive system. The elements of the new modular drive system 120 can be easily replaced without significant down time for the shovel 10.

The drive gear 130 is positioned at the second end 152 of the motor housing 141 between the flange 148 and the second bearing 149. In the illustrated construction, the drive gear 130 is removably coupled to the motor shaft 142 such that the drive gear 130 can be removed, if necessary, without removing the entire motor system 125. The drive gear 130 is a pinion, a spur gear, or any other type of drive gear that can mesh with the gear elements of the drive system 120.

FIG. 4 illustrates one way of attaching the drive system 120 to the gear case 140 of the shovel 10. Generally, the gear case 140 is positioned around the intersecting point of the boom 35 and the boom handle 85, near the saddle block 90. In one construction, the transmission unit 100 moving the boom handle 85 includes a reduction gear 168 in the gear case 140. As illustrated in FIG. 4, side portions of the gear case 140 define two apertures 170 extending through the body of the gear case 140, whereby a modular drive system 120 is retained in each aperture 170 and coupled to the gear case 140. Depending upon system needs, fewer or more than two drive systems 120 are used and coupled to the gear case 140 through fewer or more than two apertures 170. To couple each drive system 120 to the gear case 140, the motor system 125 and the gear 130 are inserted through the aperture 170. Then, the brake system 135 is coupled to the motor system 125 on the opposite side of the aperture 170. Therefore, the motor system 125 extends from one end of the gear case 140 and the brake system 135 extends from the other end of the gear case 140. The drive gear 130 meshes with the reduction gear 168 of the gear case 140. Positioning the second bearing 149 onboard of the gear 130 allows minimization of the deflections in the gear 130. The drive systems 120 are secured to the gear case 140 by inserting fasteners (e.g., screws, etc., not shown) through the openings 156 of the flange 148 into the gear case 140. The drive systems 120 are then electrically connected to the shovel controller (not shown) so that the controller monitors and/or control the crowd motors and the crowding operations of the dipper 10.

Another advantage of the modular drive system 120 is reduced maintenance. Specifically, there is no need to lubricate the second bearing 149 because when coupled to the gear case 140, the lubricant used to lubricate the reduction gears 168 will also lubricate the second bearing 149. Further, the deflection limiting bushing 147 will also be lubricated by the lubricant for the gear case 140.

Figure 5:
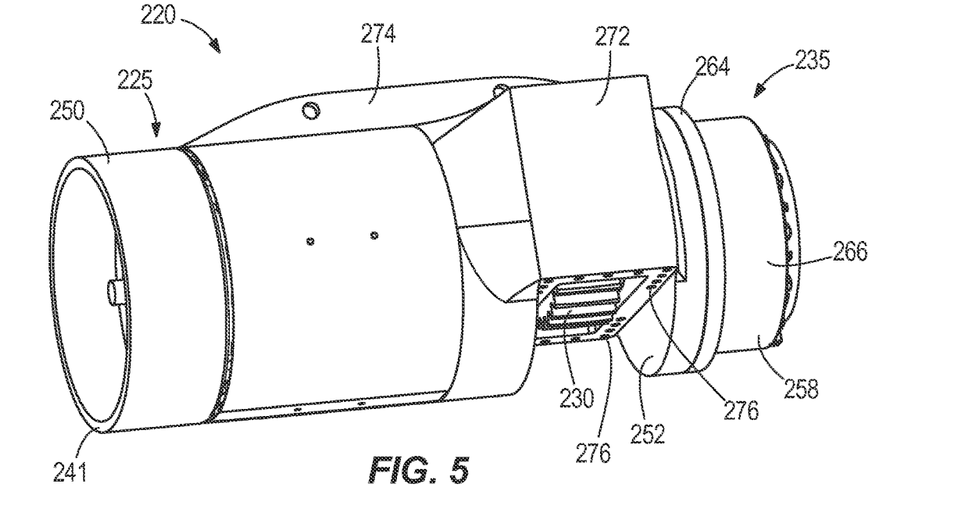
FIG. 5 illustrates a modular drive system for the industrial machine of FIG. 1 according to another construction of the invention.
Figure 6:
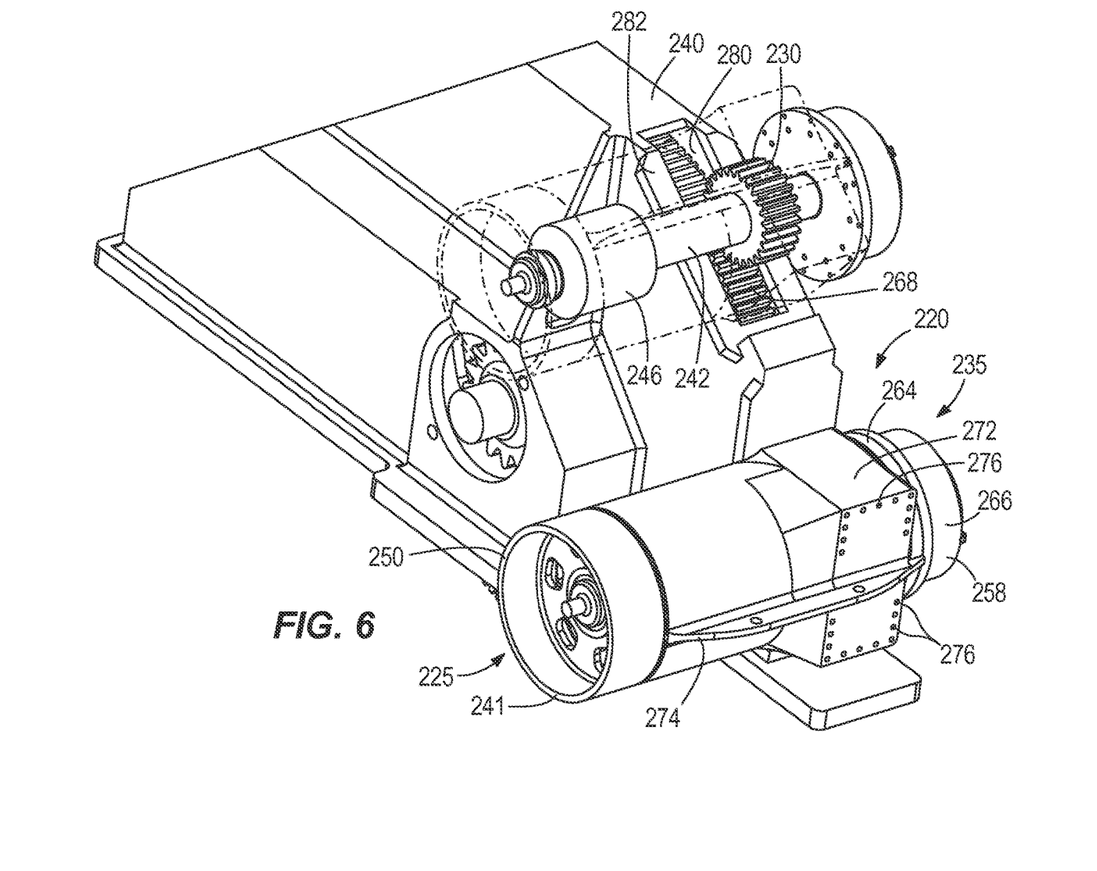
FIG. 6 illustrates the modular drive of FIG. 5 coupled to a gear case of the industrial machine of FIG. 1.

FIGS. 5 and 6 illustrate a modular drive system 220 according to another construction of the invention. The modular drive system 220 employs much of the same structure and has many of the same properties as the previously-described system 120 shown in FIGS. 2-4. Like elements have been given the same reference number, but in the "200" series of numbers.

The drive system 220 illustrated in FIGS. 5 and 6 is a fully modular drive system. In other words, the motor system 225, the drive gear 230, and the brake system 235 are installed together as one component constructed of individual removable elements. The motor housing 241 of the motor system 225 includes a housing portion 272 extending over the drive gear 230. The housing portion 272 includes apertures 276 that are used to couple the drive system 220 to the gear case 140. Further, the motor housing 241 defines a flange 274 extending upwardly from the housing 241. The flange 274 is used to lift the motor housing 241 and provides bending support to the motor housing 241.

FIG. 6 illustrates a method of coupling the drive system 220 to a gear case 240. As illustrated in FIG. 6, the top portion of gear case 240 includes two top apertures 280 (only one of which is shown in FIG. 6). A pair of mounting flanges 282 extend from the gear case 240, adjacent edges of each aperture 280. To couple the drive systems 220 to the gear case 240, each of the drive systems 220 is positioned on top of the gear case 240, with the drive gear 230 facing the reduction gear 268 of the gear case 240, such that, the drive gear 230 meshes with one of the reduction gears 268. The drive systems 220 are coupled to the gear case 240 by inserting long fasteners (e.g., screws, etc., not shown) through the openings 276 of the motor housing 241 into the flanges 282 of the gear case 240. Depending upon system needs, fewer or more than two drive systems 220 are used and coupled to the gear case 240.

Figure 7:
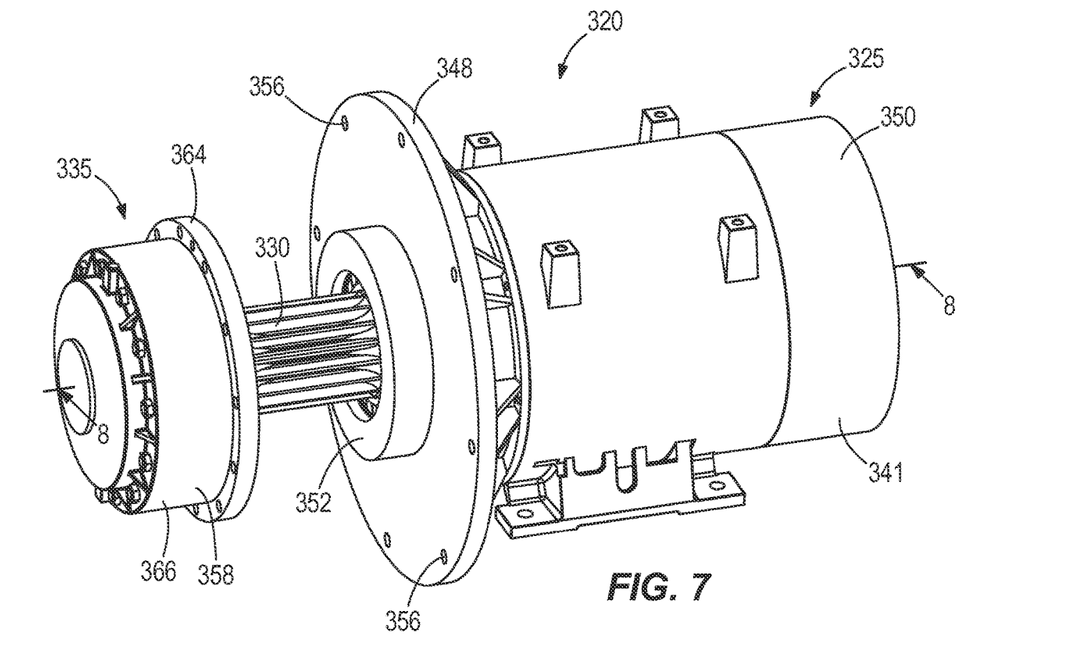
FIG. 7 illustrates a modular drive system for the industrial machine of FIG. 1 according to yet another construction of the invention.
Figure 8:
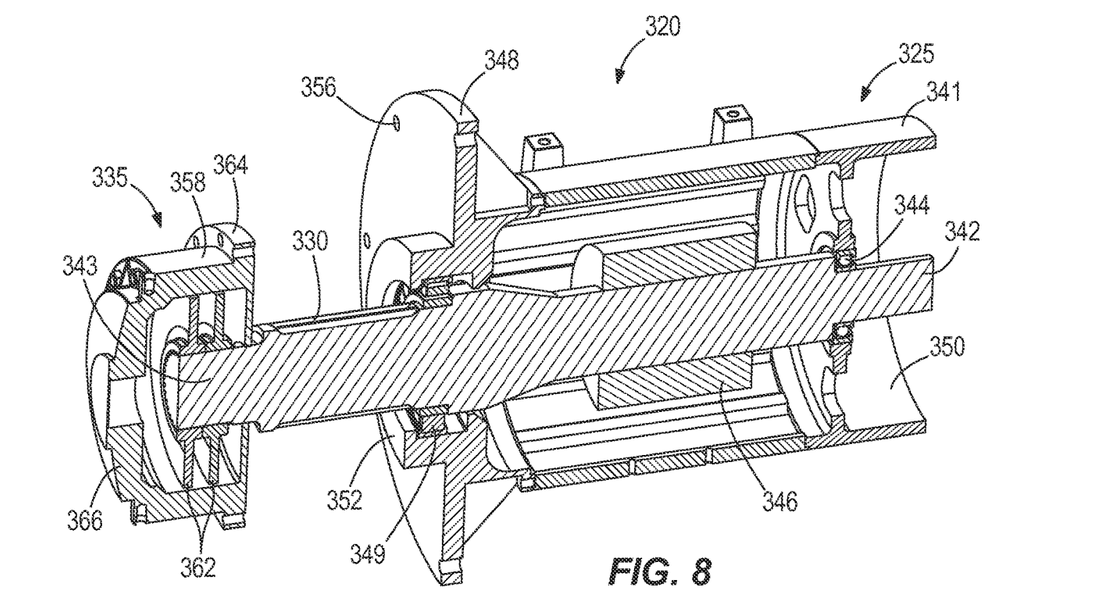
FIG. 8 illustrates a cross-sectional view of the modular drive system shown in FIG. 7 taken along section line 8-8.
Figure 9:
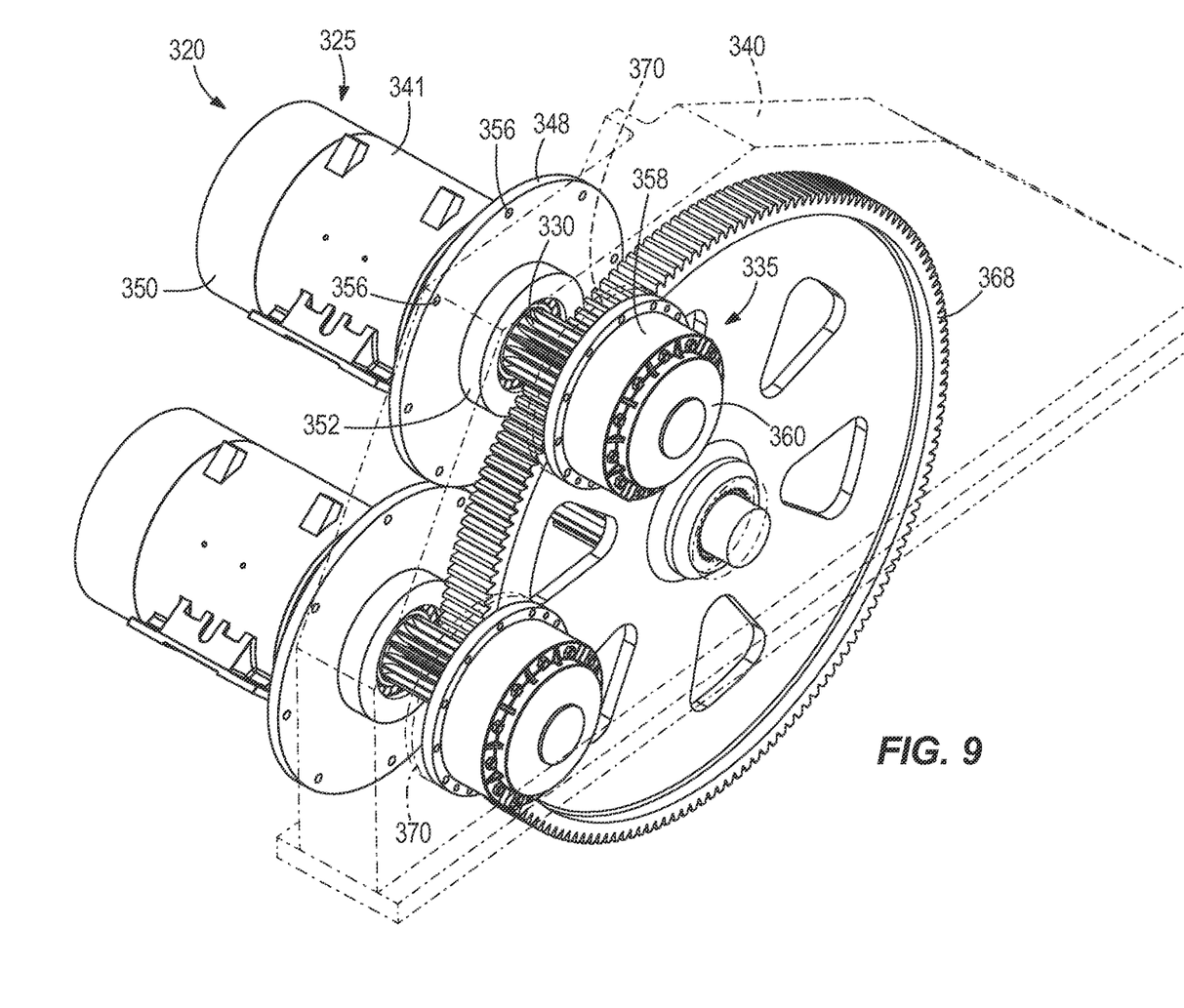
FIG. 9 illustrates the modular drive system of FIG. 7 coupled to a gear case of the industrial machine of FIG. 1.

FIGS. 7-9 illustrate a modular drive system 320 according to yet another construction of the invention. The modular drive system 320 employs much of the same structure and has many of the same properties as the previously-described systems 120, 220 shown in FIGS. 2-6. Like elements have been given the same reference number, but in the "300" series of numbers.

Figure 10:
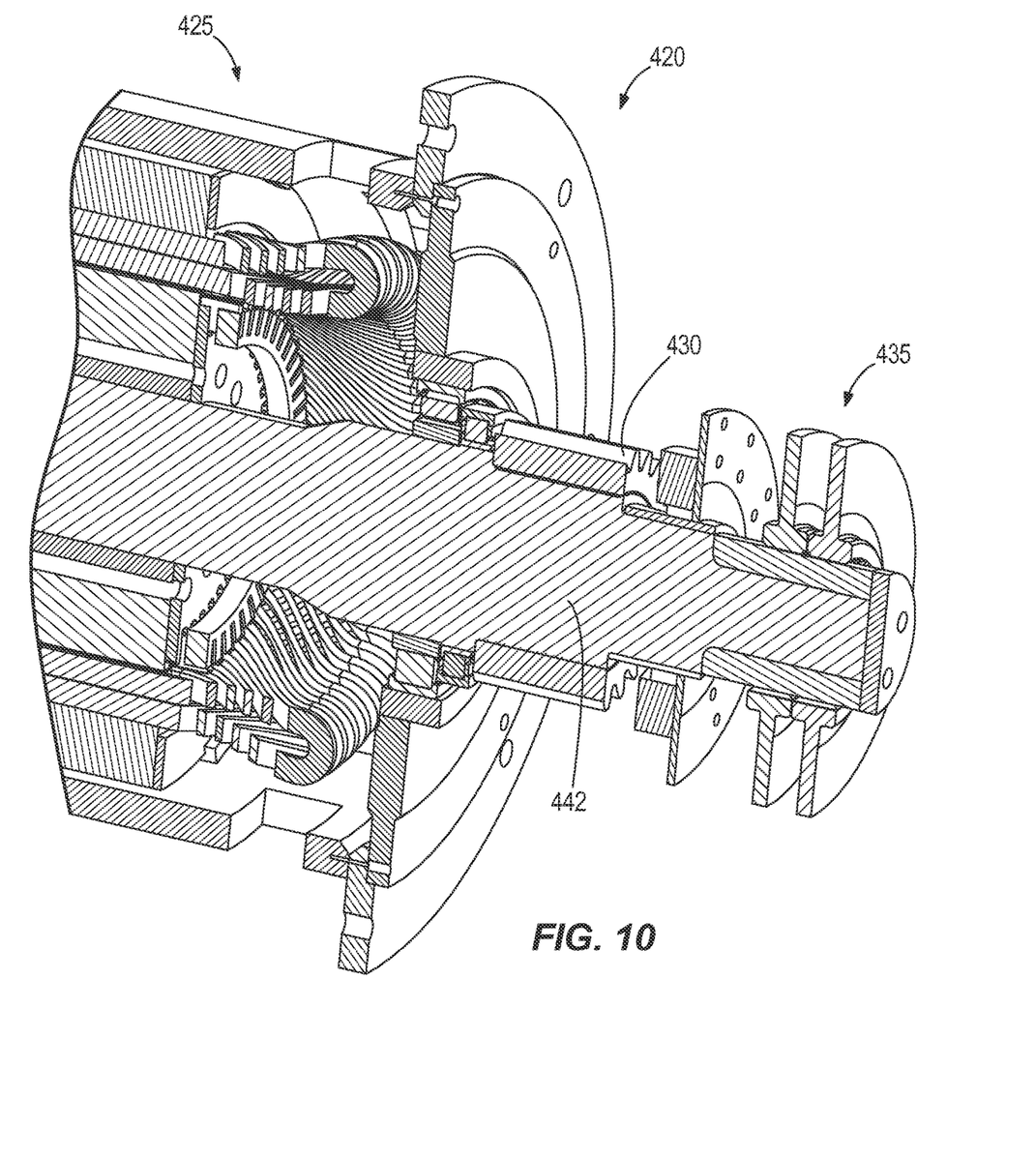
FIG. 10 illustrates a modular drive system for the industrial machine of FIG. 1 according to yet another construction of the invention.

As illustrated in FIGS. 7-9, the drive system 320 incorporates the drive gear 330 and the motor shaft 342 into a single component. The drive gear 330 is integrally formed with the motor shaft 342 as a single piece. However, and with reference to FIG. 10, in another construction 420, the drive gear 430 is not formed with the motor shaft 442 and is a separate component removably coupled to the motor shaft 442.

With continued reference to FIGS. 7-9, the second bearing 349 is not outboard of the drive gear 330. Rather, the second bearing 349 is positioned proximate the flange 348 and not proximate the brake system 335 as shown in the previous two constructions. This configuration of the drive system 320 creates an alternative modular crowd drive system, where the brake system is still outboard of the drive gear 330.

FIG. 9 illustrates a method of coupling the drive system 320 to a gear case 340. As illustrated in FIG. 9, two drive systems 320 are coupled in a manner similar to the one described with respect to FIG. 4. Specifically, the motor system 325 and the gear 330 are inserted through apertures 370. After that, the brake system 335 is coupled to the motor system 325 on an opposite side of the aperture 370. The drive gear 330 integrally formed with the motor shaft 342 meshes with the reduction gear 368 of the gear case 340. The drive systems 320 are secured to the gear case 340 by inserting screws (not shown) through the openings 356 of the flange 348 into the gear case 340. Depending upon system needs, fewer or more than two drive systems 320 are used and coupled to the gear case 340 through fewer or more than two apertures 370.

Figure 11:
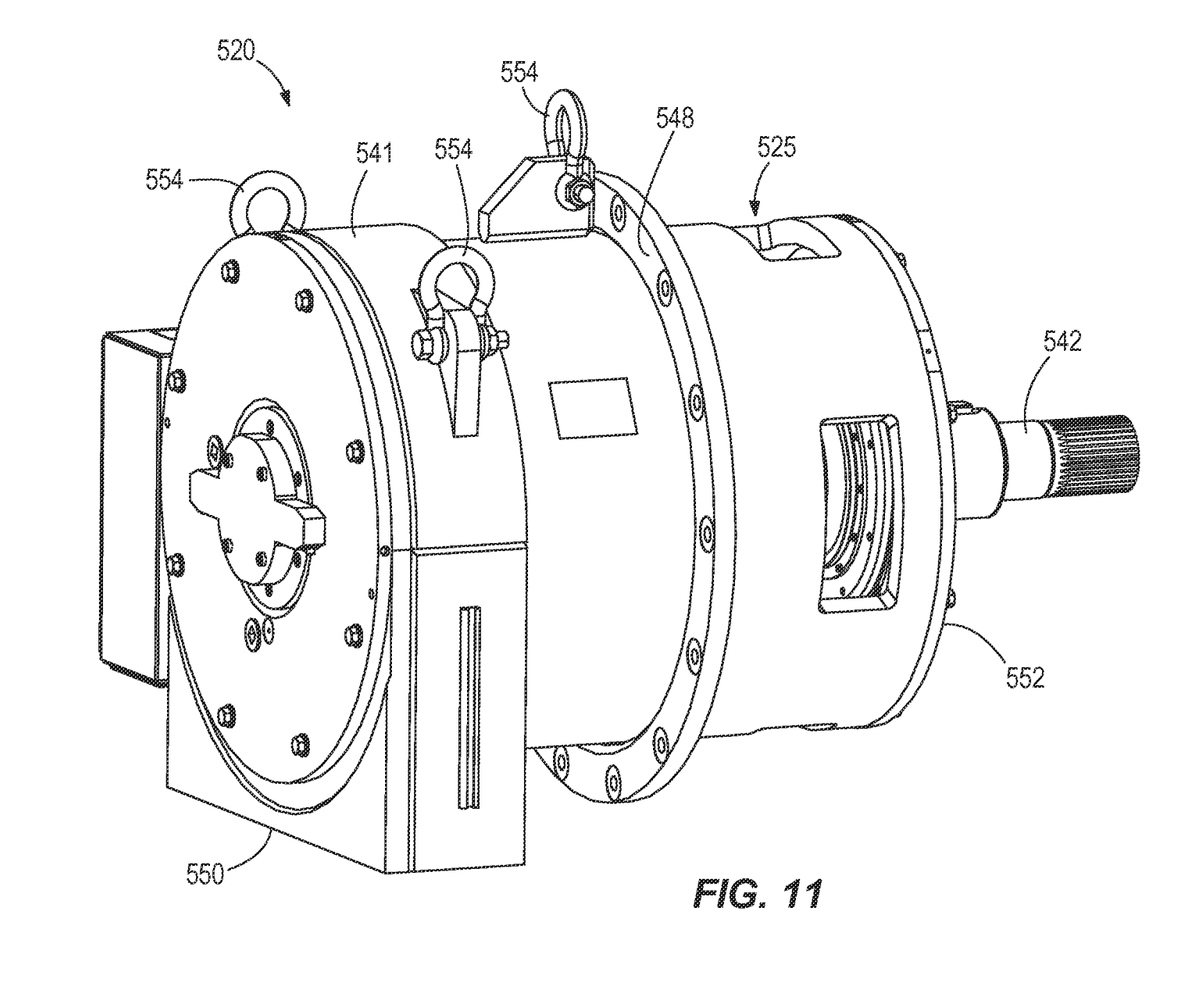
FIG. 11 illustrates a portion of a modular drive system according to yet another construction of the invention.
Figure 12:
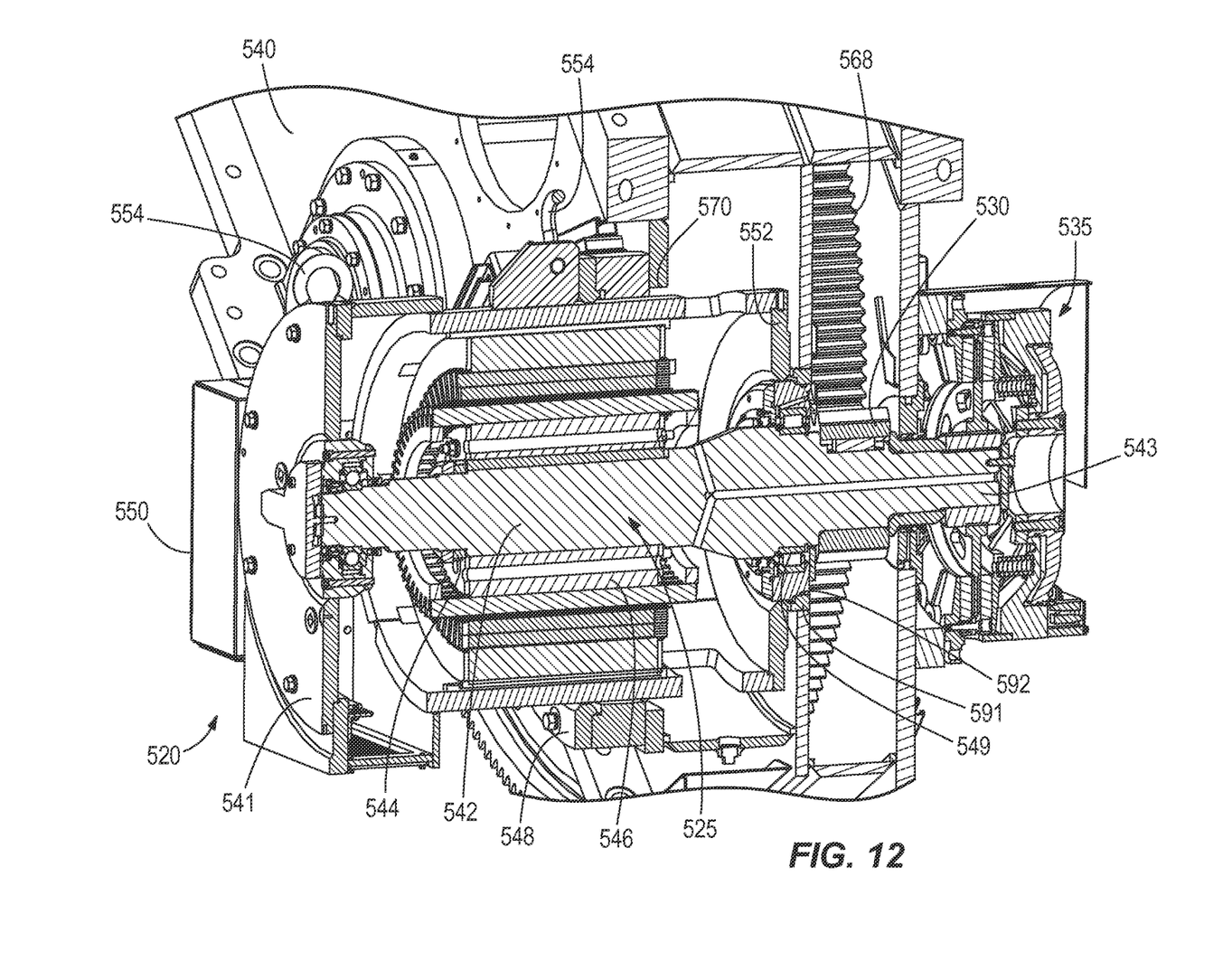
FIG. 12 illustrates a cross-sectional view of the modular drive system shown in FIG. 11, the modular drive system coupled to a gear case.
Figure 13:
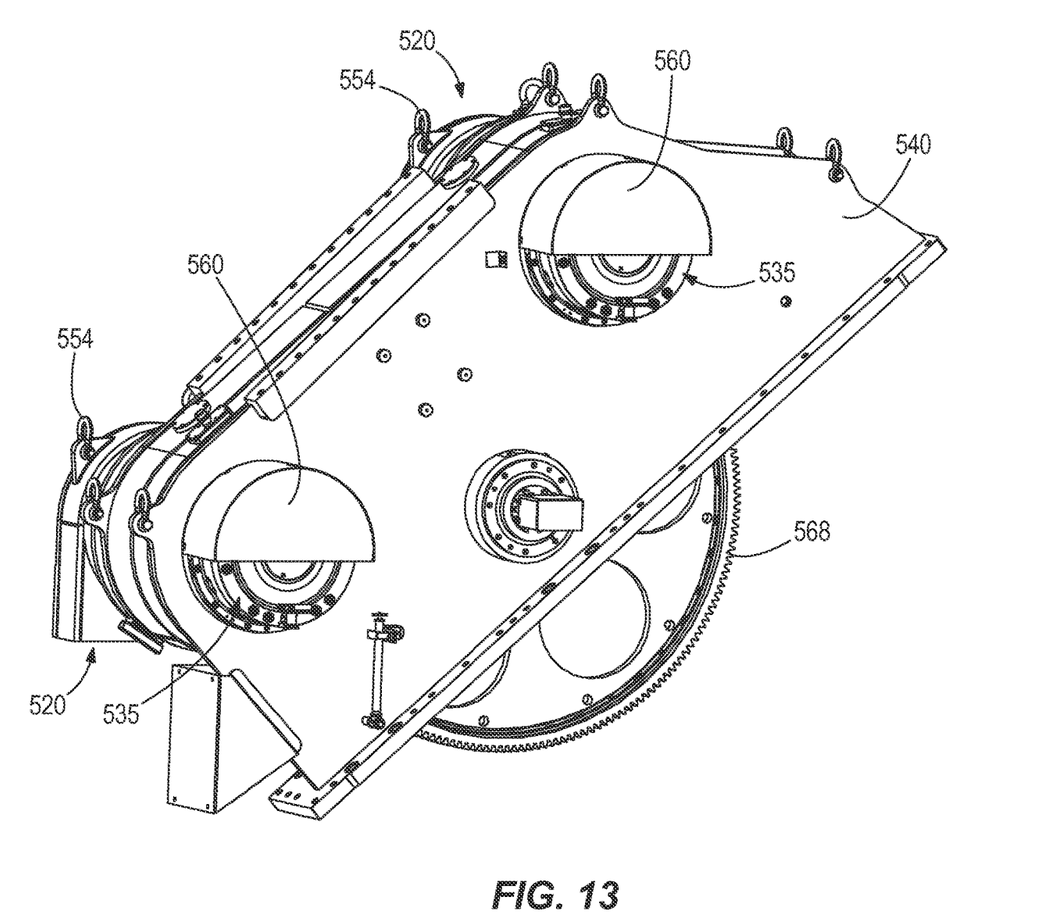
FIG. 13 illustrates two modular drive systems shown in FIG. 11 coupled to the gear case of FIG. 12.

FIGS. 11-13 illustrate a modular drive system 520 according to yet another construction of the invention. The modular drive system 520 employs much of the same structure and has many of the same properties as the previously-described systems 120, 220, 320, 420 shown in FIGS. 2-10. Like elements have been given the same reference number, but in the "500" series of numbers.

As illustrated in FIGS. 11-13, the drive system 520 includes a motor system 525 with a motor shaft 542, a drive gear 530 (e.g., a pinion), and a brake system 535. The motor system 525 includes a motor housing 541, the motor shaft 542 including a distal end 543 extending out of the housing 541 and into the brake system 535. The motor system 525 further includes a first bearing 544, a rotor 546, a flange 548, and a second bearing 549. The motor system 525 has a first, non-drive end 550 and a second, drive end 552. The drive gear 530 is a separate component removably coupled to the motor shaft 542. The second bearing 549 is inboard of the drive gear 530, rather than outboard as in the system 120. The motor housing 541 include projections 554 in the form of hoops for lifting the modular drive system 520.

FIGS. 12 and 13 illustrate a method of coupling the drive system 520 to a gear case 540. As illustrated in FIG. 13, the drive system 520 is coupled in a manner similar to the method described with respect to FIGS. 4 and 9. Specifically, the motor system 525 and the gear 530 are inserted through the aperture 570. After that, the brake system 535 is coupled to the motor system 525 on an opposite side of the aperture 570. The drive gear 530 meshes with the reduction gear 568 of the gear case 540. The drive system 520 is secured to the gear case 540 by inserting screws (not shown) through the flange 548 into the gear case 540. Additionally, within the gear case 540 there is a ring-shaped securing member 591 forming a second opening 592 adjacent the reduction gear 568. A portion of the second, drive end 552 that includes the second bearing 549 abuts the ring-shaped securing member 591. This additional alignment and fitting of the drive system 520 provides further stabilization of the drive system 520 within the gear case 540, and additionally provides ideal distribution of weight and forces on the motor system 525.

As illustrated in FIG. 13, the brake housing 558 is located beneath a shroud 560 extending partially over the brake housing 558. Depending upon system needs, fewer or more than two drive systems 520 are used and coupled to the gear case 540 through fewer or more than two apertures 570.

Although the invention has been described in detail with reference to certain preferred constructions, variations and modifications exist within the scope and spirit of one or more independent aspects of the invention as described.

The invention claimed is:

1. A mining machine comprising:
   a mobile base;
   a boom coupled to the mobile base;
   a dipper arm coupled to the boom;
   a transmission unit coupled to the dipper arm to move the dipper arm relative to the boom, the transmission unit including a gear case having an internal gear disposed therein; and
   a modular drive system releasably coupled to the gear case, the modular drive system including a motor system with a motor shaft, a first, non-drive end and a second, drive end, the motor system including a flange to releasably couple at least a portion of the modular drive system to the gear case, the modular drive system also including a brake system coupled to the motor system, and a drive gear coupled to the motor shaft, wherein the drive gear is in engagement with the internal gear of the gear case, wherein the motor shaft is a single piece motor shaft that extends entirely from the first non-drive end to the drive end and the brake system, and wherein the motor system extends from one side of the gear case.

2. The mining machine of claim 1, wherein the motor system includes a motor housing and the motor shaft extends through the motor housing.

3. The mining machine of claim 2, wherein the drive gear is integrally formed with the motor shaft.

4. The mining machine of claim 2, wherein a distal end of the motor shaft extends into the brake system.

5. The mining machine of claim 2, wherein the motor housing includes a flange, and the motor housing is coupled to the gear case at the flange.

6. The mining machine of claim 2, wherein the motor system includes a first bearing disposed between the motor shaft and the motor housing.

7. The mining machine of claim 6, wherein the motor system includes a second bearing disposed between the motor shaft and the motor housing.

8. The mining machine of claim 7, wherein the first bearing is disposed at the first end, and the second bearing is disposed between the first bearing and the drive gear.

9. The mining machine of claim 1, wherein the gear case includes a through opening, and wherein the modular drive system extends through the through opening.

10. The mining machine of claim 1, wherein the motor system is fastened to a first exterior surface of the gear case and the brake system is separately fastened to a second, opposite surface of the gear case.

11. The mining machine of claim 1, wherein the brake system is releasably coupled to the motor system.

12. The mining machine of claim 1, wherein the motor system and the brake system both extend from the gear case in a cantilevered arrangement.

13. The mining machine of claim 1, wherein multiple modular drive systems are coupled to the gear case, each of the modular drive systems including a motor system with a first, non-drive end and a second, drive end, a brake system coupled to the motor system, and a drive gear coupled to the motor shaft, wherein the drive gear of each modular drive system is in engagement with the internal gear of the gear case, and wherein the motor system of each modular drive system extends from one side of the gear case.

14. The mining machine of claim 1, wherein the drive gear is coupled directly to the motor shaft.

15. The mining machine of claim 1, wherein the drive gear is disposed entirely between the first end and the brake system.

16. The mining machine of claim 1, wherein the modular drive system includes a first bearing in the motor system that engages a first end of the motor shaft, and a second bearing adjacent the flange that engages the motor shaft, wherein the second bearing is disposed between the first bearing and the drive gear and is closer to the drive gear than the first bearing.

17. The mining machine of claim 1, wherein the brake system includes a brake housing and the motor system includes a motor housing, wherein a first end of the single piece motor shaft extends into the brake housing and a second, opposite end of the single piece motor shaft extends into the motor housing.

18. The mining machine of claim 1, wherein the flange is a first flange extending from the motor system and is releasably coupled to a first side of the gear case, and wherein the modular drive system includes a second flange extending from the brake system that is releasably coupled to an opposite side of the gear case.

* * * * *